United States Patent [19]

Dietrich, Sr.

[11] 4,279,311

[45] Jul. 21, 1981

[54] HIGH SPEED TILLER WITH WIDELY SPACED DISCS

[75] Inventor: William J. Dietrich, Sr., Congerville, Ill.

[73] Assignee: DMI, Inc., Goodfield, Ill.

[21] Appl. No.: 59,682

[22] Filed: Jul. 23, 1979

[51] Int. Cl.$^3$ ............................................. A01B 21/08
[52] U.S. Cl. ...................................... 172/509; 172/596
[58] Field of Search ............... 172/579, 580, 583, 595, 172/596, 440, 441, 442, 455, 576, 55, 56, 574, 113, 508, 509, 178

[56] References Cited

U.S. PATENT DOCUMENTS

| 726,775 | 4/1903 | Sloan | 172/509 |
|---|---|---|---|
| 807,349 | 12/1905 | Beasley | 172/509 |
| 1,557,109 | 10/1925 | Vandeberg | 172/574 |
| 2,317,567 | 4/1943 | Vinsonhaler | 172/574 X |
| 2,648,184 | 8/1953 | Cruse | 172/576 |

OTHER PUBLICATIONS

Disc Harrow Selection Guide 1975 published for Krause Plow Corp., Hutchinson, Kans.
On the Go DMI Turbo Tiger, DMI Inc., Goodfield Il.

*Primary Examiner*—Richard J. Johnson

*Attorney, Agent, or Firm*—Emrich, Root, Lee, Brown & Hill

[57] ABSTRACT

The apparatus includes a pull-type frame carried by support wheels. The frame is vertically adjustable relative to the support wheels. A first gang of discs is mounted in a forward position on the frame. The discs are widely spaced relative to each other to leave alternate strips of tilled and untilled soil. The strips of untilled soil are of substantial width, approximately equal to the width of the tilled strips. The support wheels are preferably located behind the first gang of discs in the strips of untilled soil. A second gang of discs is mounted on the frame behind the first gang. Disc blades on the second gang are located to work in the untilled strips left by the first gang; and these discs are oriented to displace soil in a lateral direction opposite to that in which the first gang displaces soil. Under high speed operation, the soil dug by each disc is thrown over the adjacent strip to fill the row formed by the adjacent disc in the forward direction. Thus, the ground is worked only once in a single pass of this system, and most of the trash remains buried; yet, primary tillage can be achieved with a minimum of ridges and furrows remaining in the soil.

9 Claims, 2 Drawing Figures

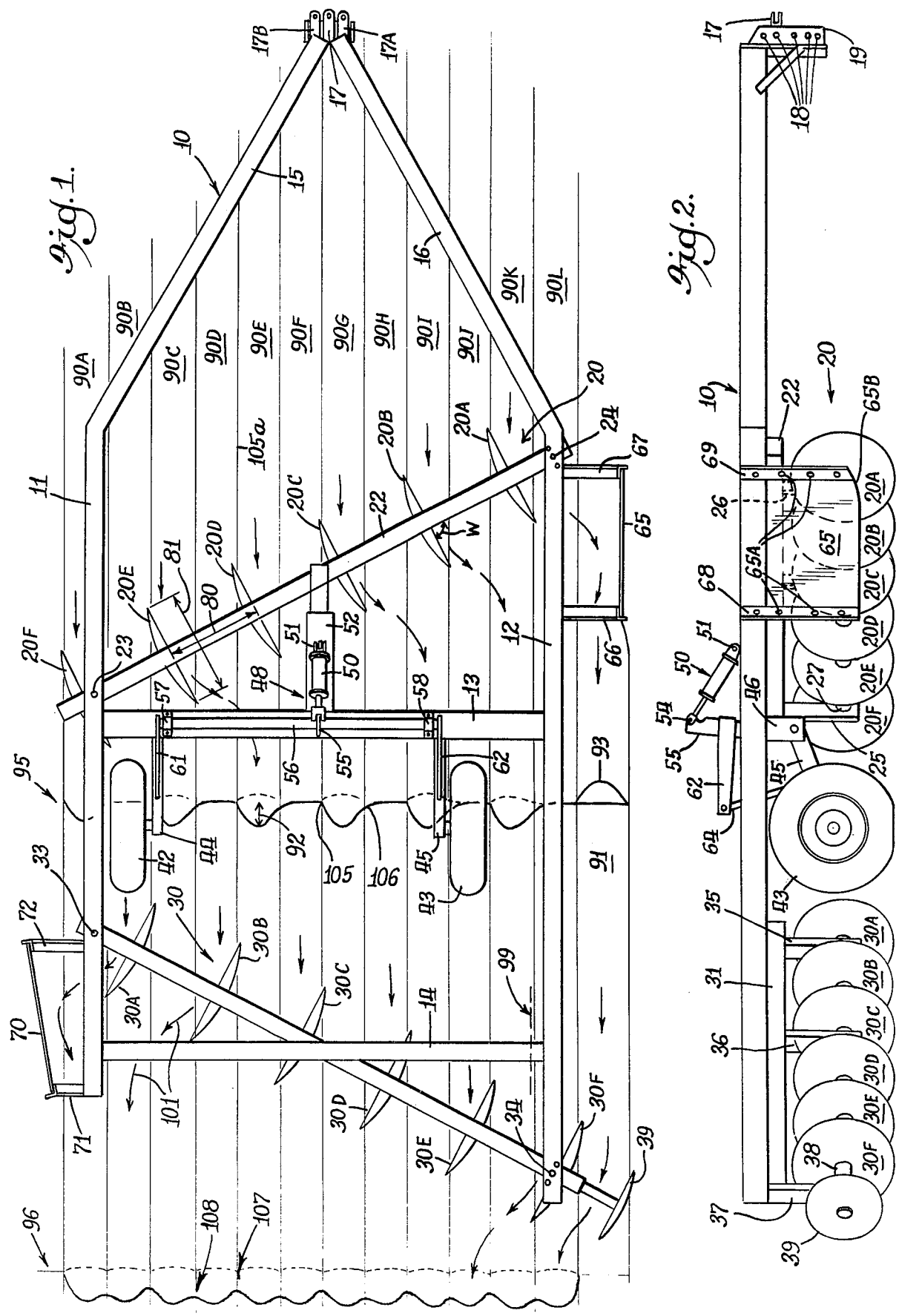

HIGH SPEED TILLER WITH WIDELY SPACED DISCS

BACKGROUND OF THE INVENTION

The present invention relates to agricultural tillage equipment; and more particularly, it relates to apparatus for achieving primary or secondary tillage using discs or "blades" as they are sometimes called. The type of tillage desired to be achieved by the present invention is similar to that achieved by conventional moldboard plows—that is, it is desired to uncover soil down to a depth of up to eight inches, and to break up the soil into larger clods and turn it over to bury any trash or residue that may have been left at the top of the soil. This is distinguished from another function sometimes performed by gangs of discs referred to as listers or bedders which are used primarily to prepare seed beds for planting with particular surface profiles depending on the crop. Such devices are not for primary tillage. In addition, tandem and offset disc harrows are used for seed bed preparation after primary or deep tillage has been achieved by a moldboard plow. Heavy disc tandems are also used to break up larger lumps of soil and pulverize the loose soil in the spring, where the soil might have been plowed using a moldboard plow in the previous fall.

Disc gangs or harrows are usually rotatably mounted on a common shaft which defines an angle relative to a line perpendicular to the direction of travel of the draft vehicle pulling it, called the working angle. Each disc gang includes a set of concave blades mounted on a common shaft. When the gang is operated at a right angle from the direction of travel, the blades roll over the ground like wheels with very little cutting. As the working angle increases disc rotation slows down, penetration increases depending on weight, and blades scoop and roll soil as they rotate. More soil is turned and trash coverage improves as the working angle increases. Soil pulverization is also increased, particularly at higher speeds, up to 7 mph. For disc harrows, whether tandem or offset, the working angle is normally in the range of 25° to 30°.

An important aspect of disc gangs of this type is the spacing of the blades relative to the size of the blades used because this factor, together with the working angle, determines the amount of coverage a single blade will achieve. Disc gangs are designed so that each gang will achieve full soil coverage (that is, no soil will be left unworked after each gang passes). The spacing between adjacent discs is normally about 35-43 percent of the diameter of the disc, and rarely is it ever 50 percent of the diameter of the disc.

Conventional disc harrows normally employ a forward disc gang and a rear disc gang. Because of the size and narrow spacing of the blades and the working angle, each gang achieves a full working of the soil, as mentioned. That is to say, the forward gang, in the case of an offset arrangement, will have each blade throw the soil toward the right, whereas the rear gang will throw all of the soil to the left, so that no net lateral displacement of the soil is realized—that is not the case for a moldboard plow, for example. This has the further advantage that the side draft on the first gang is substantially offset by the side draft on the second gang, thereby making it easy to adjust the system to the draft of the tractor.

An "offset" system is one wherein all of the blades on the forward gang face one lateral direction, and all of the blades on the rear gang face the other lateral direction. Normally, the working angle of each gang may be the same, though provisions are made for independent adjustment, if desired. A "tandem" arrangement is one wherein the forward gang is divided into two sections, each facing a different lateral direction, so that the shafts on which the discs are mounted form a chevron shape. The rear gang, also divided into two side sections, has its sections facing the lateral direction opposite to that which the section immediately in front of it faces. Thus, the shafts for the rear gangs form an inverted chevron shape (when viewed from the top).

The discs or "blades" used in these systems may have a spherical shape or their working surfaces may be frusto-conical with a relatively flat or slightly domed center portion for mounting.

Disc harrows have some disadvantages. One disadvantage is that there is a double working of the soil. Although this has some advantages where it is desired to pulverize the soil, it uses more energy and is relatively inefficient in terms of working the soil. Further, because of the large number of blades relative to the width of a swath worked, in order to obtain soil penetration deeper than a few inches, it is a common practice to add weight to the frames, thereby further reducing efficiency and increasing the drag force. These systems are also limited in the forward speed at which they can be driven. Typically, the speed is in the range of 3 to 4½ miles an hour. Modern tractors with higher drawbar power and better transmissions are capable of sustained speeds at higher levels, but the farmer usually cannot take advantage of this with conventional disc harrows because at higher speeds, the soil is thrown to the side a much further distance, and this increases the drag caused by the attachment. Further, at higher seeds the soil pulverization increases, and this is not desirable for primary tillage operations particularly in the fall. For example, the large slabs and clods created by a moldboard plow in the fall produce a soft and mellow soil in the spring after winter's freezing and thawing. If the soil were highly pulverized in the fall, the ground would become compact and hard over the winter with little or no capacity for absorbing and retaining water.

Disc harrows are also prone to "plugging"—that is, because of the close spacing of individual discs, an accumulation of crop residue such as corn stalks will become lodged between the disc, thereby greatly reducing their ability to work the soil. This characteristic is aggravated if the stalks are frozen or the gound is muddy. Another operational disadvantage of these systems is that whereas the first gang of discs will roll the top soil to cover the trash, the second gang, because it does substantially the same work, also rolls the soil and has a tendency to uncover trash that has been buried by the forward gang. A loss of efficiency occurs when trash is buried and then uncovered; and this also reduces the farmer's ability to determine the amount of trash that will ultimately remain buried.

There is a type of disc implement which is used for primary or secondary tillage. These are sometimes referred to as disc tillers or "one-ways" because they comprise a gang of sherical blades all facing the same direction, such as to the right. Hence, they normally throw the soil one-way and therefore require continuous plowing in the same direction, like a moldboard plow. One-ways are efficient tools in terms of horsepower-hours per acre for working large acreages, but they are known to be difficult to adjust because they operate at a substantially greater angle than disc tillers—usually about 45°—and thereby create a substantial side draft which may upset any adjustment as soil conditions vary. For this reason, heavy tandem and offset disc harrows are sometimes used instead. Working depth of disc tillers may be varied from 3-8 inches, depending upon the size of the blade and the spacing, soil conditions and weight. Because there in only a single working of the soil at a relatively low speed, relatively deep furrows are left after the soil is worked.

SUMMARY OF THE INVENTION

The present invention includes a pull-type frame which is adapted to be mounted to a tractor, and is equipped with its own support wheels. The frame is vertically adjustable relative to the support wheels. A first gang or set of discs is mounted in a forward position. The discs are widely spaced to leave alternate strips of tilled and untilled soil. Typically, the spacing of the discs will be greater than 75 percent of the diameter of the blade, and preferably it will be approximately 80 percent of the diameter, depending upon the working angle of the gang. In this manner, the width of a strip left untilled by the first set of discs is said to be of substantial width, meaning that further tillage is required for completion of the task. If the working angle is defined as the included angle between the axis of the discs and a line perpendicular to the direction of travel of the vehicle, normally, the greater the working angle, the larger will be the width of strips of soil worked by the blades.

A second gang of widely-spaced discs is mounted on the frame behind the first gang, and the working surfaces of these discs are faced to displace soil in a lateral direction opposite to that in which the first gang displaced the soil, thereby offsetting the side draft on the first gang of discs. Further, the discs of the second gang are located to work the untilled strips of soil left by the first gang. This arrangement provides a complete working of the soil transversed by the system, but the soil is worked only once so that the trash is dug up and covered by the first gang is not uncovered by the second gang. It also permits deeper soil penetration by the blades for a given machine weight because the weight per blade is greater than for conventional disc tillers.

The present invention is designed for high speed operation—namely, speed in a range of 4½ to 8 miles an hour. Under proper speed setting and disc spacing, the soil dug by each disc or blade is thrown over the adjacent strip of untilled soil to fill the furrow formed by the preceeding disc on the same set of discs. Thus, not only is the ground completely worked in a single pass of the system without any substantial amount of double-working and while keeping the trash buried, but the furrows are filled. This reduces soil erosion by reducing surface troughs in which the water will run off.

In a preferred embodiment, the soil dug by the leading disc on the forward gang is deflected off a shield to form a windrow adjacent the non-working surface of the trailing disc of the rear gang, and a raker blade is located on the rear gang for raking the windrowed soil behind the trailing disc on the rear gang to fill the furrow formed by that trailing disc.

Further, a deflector blade (which may be slightly inclined relative to the direction of travel) is located to receive the soil dug by the forward blade on the rear gang and to deposit that soil to fill the furrow formed by the rear disc on the forward gang. Thus, no furrows are left in the soil which permits the farmer to work adjacent swaths in opposite directions, as many prefer to do.

The support wheels are located between the first and second gangs in the strips of ground left untilled by the widely spaced discs of the first gang. Hence, the system does not have to operate in a previously formed furrow, and it can be pulled in one direction for one swath and in the opposite direction for the swath immediately adjacent.

In summary, the present invention provides a tillage tool which is efficient in terms of horsepower-hours per acre in operation, and which is capable of operation at high speeds, in comparison to conventional one-ways and ganged discs. Further, by working the soil only once, most of the trash or residue, or as much as is desired, remains buried. There are no furrows left after the soil is worked, and there is no net lateral displacement of soil. Hence, adjacent swaths can be worked in opposite directions. There is no substantial net side draft on the system so it is easily adjusted, and once adjusted, it is not likely to require further adjustment for a given set of soil and moisture conditions. The support wheels for the frame operate in untilled ground but are followed by discs. Hence, the system does not operate in a furrow and can be pulled evenly, but it does not leave compacted soil due to support wheels. The wide spacing of the discs reduces the tendency toward plugging in heavy trash, and also obviates the need for scrapers for the discs.

Other features and advantages of the present invention will be apparent to persons skilled in the art from the following description of a preferred embodiment accompanied by the attached drawing wherein identical reference numerals will refer to like parts in the various views.

THE DRAWING

FIG. 1 is a plan view of apparatus constructed according to the present invention in an offset configuration; and FIG. 2 is a right side view of the apparatus of FIG. 1.

DETAILED DESCRIPTION

Referring then to the drawing, reference numeral 10 generally designates a frame which may be fabricated from tubular steel elements. The frame 10 includes left and right side members 11, 12 which extend parallel to the direction of travel and are braced by a forward cross frame member 13 and a rear cross frame 14. Extending from the forward ends of the side frame members 11, 12 are first and second centrally inclined forward frame members 15, 16 which are joined together at their forward ends to which a hitch clevis generally designated 17 is mounted. The clevis 17 is adapted to mount to a conventional hitch. The clevis 17 can be mounted in the center position or at right or left side positions as indicated at 17A and 17B to adjust for lateral draft. These positions are determined by four upright plates welded to the frame; and all such plates are provided with a set of vertically spaced apertures (see apertures 18 on plate 19 in FIG. 2) for vertical adjustment.

A forward gang of discs generally designated 20 is mounted to the frame 10 by means of an elongated support member 22 which may also be made from tubular structural metal. The support member 20 is secured to the side frame members 11 and 12 by pins 23, 24 respectively, as seen in FIG. 1. Alternate pin locations are seen on the side frame member 12 for adjusting the working angle of the forward gang of discs. Referring now to FIG. 2, upright arms 25, 26 and 26A are welded to the bottom of the support member 22 and depend therefrom to receive a horizontal shaft 27 on which the individual discs of the forward or first gang 20 are mounted.

There are six working discs in the gang 20 and they are designated respectively 20A-20F. The discs 20A-20F are mounted to the shaft 27 in a conventional manner—that is, a bearing is placed on the shaft, followed by the disc, and then a spacer for separation. The remaining discs are similarly assembled to the shaft. Although the discs are actually ganged on a common shaft for economy, this is not essential to achieve the desired operation, hence the word "set" rather than "gang" is used as a generic term. The discs of the first gang 20 are inclined in such a manner as to throw dirt toward the right of the apparatus, as it is viewed from the rear (that is, toward the bottom of FIG. 1).

A second or rear gang or set of discs generally designated 30 is located behind the first gang 20, and it includes 6 individual discs designated respectively 30A-30F. The discs of the gang 30 are mounted similar to those of the first gang 20, and they are supported by a support member 31 mounted beneath the side members 11 and 12 by pins 33, 34. The working angle of the rear gang may also be adjusted using alternate pin locations on the frame. Depending from the support member 31 are three arms designated respectively 35, 36 and 37 in FIG. 2. The blades are mounted on a shaft 38 which is supported by the arms 35-37, and the discs are separated by spacers, as indicated.

Also located on the shaft 38, following the rear most blade 30F is a smaller raker blade 39, the function of which will be described presently.

The frame 10 is a pull-type frame, that is, it includes its own support wheels 42, 43 which are received on spindles mounted respectively to arms 44, 45. The upper ends of the arms 44, 45 are rotatably mounted to plates extending beneath the transverse frame member 13 (see plate 46 for the arm 45 in FIG. 2). A hydraulic mechanism generally designated 48 is incorporated to adjust the height of the frame, and it includes a hydraulic cylinder and piston rod unit 50 having its cylinder end pivotally connected at 51 to a support 52 extending between the cross frame member 13 and the forward support member 22. The rod end of the unit 50 is pivotally connected at 54 to a crank arm 55, the lower end of which is rigidly secured to an axle 56, seen in FIG. 1. The axle 56 is mounted in pillow blocks 57, 58 which are, in turn, mounted to the cross frame member 13 so that the axle 56 can be rotated in either direction depending upon whether the hydraulic cylinder unit 50 is extended or retracted. The outboard ends of the axle 56 are provided with arms 61, 62 respectively; and each of these arms, in turn, is provided at its distal end with a link connected to an associated one of the wheel support arms 44, 45 (see the link designated 64 for the arm 62 in FIG. 2).

Briefly, the frame 10 is raised by extending the hydraulic cylinder unit 50 which cranks the lever arm 55 in a counterclockwise direction, thereby urging the links 64 downwardly and raising the forward ends of the wheels support arms 44, 45 to raise the frame against the reaction of the support wheels, 42, 43.

A forward dirt shield 65 is mounted to the outboard side of the side frame member 12 by means of a pair of cantilever arms 66, 67. Extending downwardly from the arms 66, 67 are upright support angles 68, 69, the ends of which contain a plurality of vertically spaced apertures for receiving bolts 65A in corresponding apertures of the shield 65 which has additional apertures to provide for vertical adjustment of the dirt shield 65. The lower portion of the dirt shield is curved smoothly toward the rear as at 65B in FIG. 2 to reduce any tendency to catch trash during operation.

A similar rear dirt shield 70 is similarly mounted for vertical adjustment by a pair of cantilever arms 71, 72 on the outboard side of the side frame member 11 adjacent the forward disc 30A of the second gang 30. It will be observed that the rear shield 70 is located in a vertical plane which is inclined inwardly proceeding toward the rear of the apparatus. The functions of the dirt shields 65, 70 will be described below.

OPERATION

Each of the discs 20A-20F on the first set as well as the discs 30A-30F on the second set are widely spaced. As that term is used herein, it refers to the fact that the spacing of the discs along the axis of the shaft on which they are mounted (as represented by the arrow 80 in FIG. 1 between the discs 20D and 20E), is greater than 75 percent of the diameter of the blade, as represented by the arrow 81 for the blade 20E. If the discs are not co-axial, then the term requires that they are moved parallel to the direction of travel until their axes are aligned. This will maintain the same lateral spacing. Preferably, the spacing is about 80 percent of the diameter of the blade to the effect that a strip of untilled soil of substantial width is left between adjacent blades for each gang. By "substantial width" in this context, it is meant that the width of the untilled strip is almost as wide as that of a tilled strip so that the untilled strip requires additional working by a blade of the second gang 30 which is located to work in the strip of untilled soil without appreciable overlap or double working by the blades.

To understand the operation of the system, it may be helpful to turn the page of the drawing a quarter turn counterclockwise so that in operation, a tractor pulls the frame toward the top of the page. The swath cut by the system is divided into 12 strips extending parallel to the direction of travel of the apparatus and designated respectively 90A-90L. This is an idealized illustration for the purpose of explanation only and not to be taken absolutely literally since the varying conditions of soil and adjustment will inevitably change the lines in actual operation. Each of these strips is worked by one and only one of the disc blades in this idealized example. For example, the strip 90A is worked by the blade 20F. The strip 90B is worked by the blade 30A, and so on. To the right of the last working strip 90L, there is located, for identification, a strip designated 91 in which the raker blade 39 is positioned, as will be explained.

The working angle of each of the gangs is represented by the angle designated W adjacent blade 20B in FIG. 1. Preferably the blades have a diameter of 24 to 26 inches on a 20 or 22 inch spacing (designated by arrow 80); or 30 inch blades could be used on a 24 or 26 inch spacing. The angle W may be in the range of 20° to 30°, and preferably is set at about 25° for high speed operation. The hydraulic cylinder 50 is adjusted so that each of the blades cuts a furrow having a maximum depth of approximately six to eight inches, as illustrated by the arrow 92 located in the strip 90E between the support wheels, 42, 43. The curve shown there is an idealized profile of the soil after working by the first gang of plows.

When the apparatus is pulled at high speed, the soil displaced by the leading blade 20A is thrown against the dirt shield 65 to form a mound represented at 93 in the strip 91. The soil profile can be thought of as a vertical cross section of the ground taken in a plane located in the position in which the profile is shown. There are two soil profiles shown in the drawing, one is generally designated 95, and it is located after the first gang 20 but before the second gang 30. The second profile is generally designated 96, and it is taken after both gangs of plows have worked the soil, as will be more fully described presently.

Returning, then to the operation of the individual discs, it will be observed that the first disc 20A, under high speed operation, actually displaces the soil laterally to the right beyond the next adjacent strip 90L. The same is true for the second disc 20B—namely, it displaces soil from the strip 90I over the strip 90J to fill the furrow in strip 90K cut by the disc 20A, which is sometimes referred to as the preceding adjacent disc or the disc adjacent the working surface of disc 20B. The working surface of a disc is the concave surface.

As indicated, the soil profile 95 is idealized. It shows the loose dirt tilled by blade 20B to fill and be slightly raised above the trough or furrow cut by blade 20A. It cannot be said that all of the dirt from one blade is displaced and confined within the furrow of the immediately preceding blade because this will vary depending on soil conditions, moisture and speed of operation. However, when compared with the trough and furrows left by a one-way disc tiller or conventional tandem or offset disc harrows or moldboard plows, a surprisingly uniform level of tilled soil is left by the present invention, relatively free of ridges and furrows, after a complete working by the apparatus.

The second gang of blades 30, on the other hand, is disposed to displace the soil it works in an opposite lateral direction. That is, the first gang 20 displaces the soil to the right, whereas the second gang displaces it to the left, thereby offsetting most, if not all of the lateral draft on the frame and support wheels caused by the working of the soil by the first gang. If the soil is extremely hard and deep tillage is being sought, it may be helpful to incorporate a conventional keel wheel of a type known in the art at a location on the rear cross frame member 14, for example, at the location indicated by the dashed line 99.

It will be observed that the soil displaced by the blades on the second gang is also thrown over the strip adjacent the working surface into the furrow generated by the immediately preceding blade. This is illustrated by the arrows 101 for the blade 30B which displaces soil into the furrow formed in the strip 90B by the blade 30A. The leading blade 30A on the rear gang throws the soil from the furrow it cuts against the inclined rear dirt shield 70 which directs the loose soil into the trough in the strip 90A formed by the rear blade 20F on the forward gang 20.

The raker blade 39, as discussed, fills the trough in strip 90L formed by the rear working blade 30F by scraping the soil indicated by the mount 93 in the strip 91 formed from the foremost working blade 20A, operating in strip 20K.

The leading edges of a cooperating pair (one in the forward gang and one in the rear gang) are located such that their leading cutting edges overlap slightly—i.e. about ½ to 2 inches. To illustrate this, consider the line 105a separating strip 90D from strip 90E. Because of its circular shape, the leading edge of the blade 20D when viewed in plan is slightly ahead of and to the side of the actual cut line (i.e. where the blade enters the soil) as represented by the line 105a. The cut line is called the leading cutting edge of the blade. Similarly, the blade which cooperates with the blade 20D on the rear gang is designated 30B and its leading edge is also located to the right of the line 105 so that its leading cutting edge overlaps the leading cutting edge of the associated blade on the forward set by about ½ to 2 inches.

It is well known in connection with disc blades the forward part of the non-working surface of the disc exerts a lateral force against the furrow wall. In the case of the present invention the non-working surfaces of discs 20D and 30B are placed in back-to-back relation. The leading disc cuts a furrow, and the leading cutting edge of the associated cooperating blade on the rear set 30B enters the soil with overlapped leading cutting edges and tends to cut away from the furrow formed by blade 20D. Because the previous furrow has weakened the wall, however, the second disc breaks the wall down even further due to this lateral force exerted by the non-working surface of disc 30B, as just mentioned. This is illustrated in the area designated 107 in the second soil profile 96. This area is the most shallow tillage area in the profile. An adjustment of the leading cutting edges of the cooperating pairs of discs, one in the forward gang and one in the rear gang, can be made to vary the profile in this region.

It will also be observed that the rear edge of a blade creates a scooping or shoveling effect on the soil, as can be seen by comparing the slopes at 106 (more scooping or "hogging" as the farmers call it) with the greater slope at 105 caused by the cutting action of the leading edge. This is particularly true, for example, in the case of the blades on the rear set 30 because their trailing edges are working in soil adjacent to a furrow which has already been formed. For example, the trailing edge of blade 30B is working toward a furrow formed in strip 90C by the blade 20E on the forward gang. This scooping force will bring the soil profile in the region designated 108 lower than that in the region designated 107 as explained above.

It will thus be appreciated that whereas the top of the worked soil has no ridges, the sub-soil profile achieved by the present system is advantageous because it is irregular with a series of troughs, and therefore prone to break up any existing plow sole that may have been created by a previous working of the soil. This is in contradistinction from moldboard plows which tend to create and re-create a rather level plow sole at the plowing depth, if plowing at the same depth is repeated. A plow sole is a region of compacted soil which has the disadvantage of inhibiting root penetration and causing water to drain rather than to be absorbed by the soil. The soil profile shown at 96 also has the advantage of creating troughs beneath the surface of the soil for greater water retention since the troughs are filled with loose, not compacted soil.

It will be observed that all of the soil over which the apparatus passes is worked, but it is only worked once. Hence, the system is efficient in terms of horsepower-hours per acre. Further, because of the turning, twisting motion of the discs, the residue and trash near the surface of the soil is turned under as the soil is worked, and the blades of the rear gang do not uncover the trash buried by the forward gang. It will also be observed that all of the soil worked remains loose because the support wheels 42, 43 run on unplowed ground but the blades 30A and 30E work the strips in which they are located, but behind the wheels. The apparatus remains level during operation because the support wheels need not run in a furrow. Since the forward gang works approximately one half the soil and displaces it toward the right, whereas the rear gang works the other half of the soil and displaces it toward the left, the net lateral soil displacement is minimal, so that the apparatus can work one swath in one direction and the adjacent swath in the reverse direction.

Having thus disclosed in detail a preferred embodiment of the invention, persons skilled in the art will be able to modify the structure disclosed and substitute equivalent elements while continuing to practice the principle of the invention. For example whereas the disc gangs in the illustrated embodiment are shown in an offset arrangement, a tandem arrangement could equally well be used. It is, therefore, intended that all such modifications and substitutions be covered as they are embraced within the spirit and the scope of the appended claims.

I claim:

1. Apparatus for tilling soil adapted to operate at ground speeds in excess of about 4½ miles per hour, comrising: a frame; at least a first set of rotatable discs carried by said frame for tilling the soil and adapted to throw the soil in a first lateral direction, the discs of said first set being spaced from each other at least as great as about 75 percent of the diameter of said discs to leave alternate strips of tilled and untilled ground; at least a second set of discs carried by said frame to the rear of said first set and adapted to throw soil in a lateral direction opposite to said first lateral direction; the discs of said second set being spaced from each other at least as great as about 75 percent of the diameter of said discs and located at till said strips of untilled soil left by said first set, the lateral working width of said discs of said second gang being sufficient to work said strips of untilled soil left by said first set, first deflector means adjacent the working surface of an outermost disc of said first set for channeling dirt thrown thereby onto a strip of untilled ground in front of an associated outermost disc of said second set; and second deflector means adjacent the working surface of an outermost disc of said second set for deflecting soil thrown thereby into a furrow formed by a disc on said first set, the axes of said discs of said first and second sets being substantially horizontal and defining a working angle in the range of about 20° to 35°, whereby all of the soil is tilled in a single pass of said apparatus without substantial overlap of said discs of said first and second sets and said apparatus leaves the soil substantially free of ridges and furrows.

2. The apparatus of claim 1 wherein said support wheel means is located between said first and second sets of discs and comprises ground-engaging wheels riding on strips of untilled ground left by said first gang.

3. The apparatus of claim 1 characterized in that the spacing of each pair of adjacent discs is approximately 80 percent of the diameter of the disc.

4. The apparatus of claim 1 wherein said angle is about 27°.

5. The apparatus of claim 1 further comprising means for adjusting the height of said frame relative to said support wheels to thereby adjust the working depth of said discs.

6. The apparatus of claim 1 wherein said second deflector means is characterized as being inclined toward the centerline of said apparatus when proceeding toward the rear thereof.

7. The apparatus of claim 1 wherein each disc of said second set is associated with a disc of said first set such that their non-working surfaces face opposite sides of said apparatus and their leading cutting edges are placed along substantially the same plane parallel to the direction of travel of said apparatus.

8. The apparatus of claim 7 wherein said leading cutting edges of said cooperating pairs of associated discs overlap in the range of about ½ to 2 inches.

9. The apparatus of claim 8 wherein the trailing edges of discs in said first and second sets are placed along the same planes parallel to the direction of travel of said apparatus.

* * * * *

UNITED STATES PATENT AND TRADEMARK OFFICE
CERTIFICATE OF CORRECTION

PATENT NO. : 4,279,311
DATED : July 21, 1981
INVENTOR(S) : William J. Dietrich, Sr.

It is certified that error appears in the above—identified patent and that said Letters Patent is hereby corrected as shown below:

Column 9, line 31, "comrising" should be -- comprising --.

line 42, "at" should be -- to --.

Signed and Sealed this

Twenty-second Day of September 1981

[SEAL]

Attest:

GERALD J. MOSSINGHOFF

Attesting Officer

Commissioner of Patents and Trademarks